Dec. 2, 1969

M. E. GILWOOD ET AL 3,481,868

WATER CLARIFIER AND WATER CLARIFICATION METHOD

Filed Oct. 31, 1967

United States Patent Office 3,481,868
Patented Dec. 2, 1969

3,481,868
WATER CLARIFIER AND WATER
CLARIFICATION METHOD
Martin E. Gilwood, New Brunswick, N.J., and Jean des
Chatelets, Magnolia, Mass., assignors to Pall Corporation, Glen Cove, N.Y., a corporation of New York
Filed Oct. 31, 1967, Ser. No. 679,406
Int. Cl. B01d 21/01
U.S. Cl. 210—19
15 Claims

ABSTRACT OF THE DISCLOSURE

A process and apparatus for clarifying water are provided by this invention. The apparatus consists of a vessel, a conical baffle extending longitudinally of the vessel defining a clarification zone at the periphery of the vessel and a mixing zone at the interior of the baffle. A mixing enclosure and mixer are provided within the baffle to mix influent waste water with flocculating agents causing the particles to agglomerate and circulate waste water under the baffle to the clarification zone. A sludge collector is provided at the bottom of the vessel. A hydraulic pulse means is also provided to direct a pulse of water against the sludge and the sludge at the bottom of the vessel to the sludge collector.

The instant process is the improvement in the clarification process carried out by the clarifier outlined above which comprises intermittently directing a pulse of water against concentrated sludge at the bottom of the vessel to move it to the sludge collector.

---

This invention relates to a method and apparatus for clarifying waste water, and more particularly, to a method and apparatus for clarifying waste water employing improved means for removing concentrated sludge from the clarifier vessel.

With the great industrial growth and urbanization of recent years, there has come an increasing degree of pollution of lakes, streams and rivers, and resultant ever increasing scarcity of acceptable fresh water supplies. The magnitude of the problem has awakened local, state and federal authorities to the need for remedial and restrictive legislation controlling the discharge of waste water. It has accordingly become desirable, if not imperative, for most water-dependent industries and municipalities to purify waste waters before discharging them into streams or rivers, or for reuse, so as to conserve the available supplies of water. The resulting demand for water clarification systems that are both efficient and inexpensive to operate, as well as compact, has been very great.

The usual technique for clarifying aqueous liquids has involved the addition to the liquid of a suitable reagent adapted to precipitate or flocculate the suspended material, after which the suspended material is separated by any of a variety of techniques. U.S. Patent No. 3,068,172, patented December 11, 1962, to Leviel and Croce-Spinelli, recommends the sludge blanket technique, in which the liquid in a continuous rising flow is passed through a blanket of sludge, in which the particles suspended in the liquid are continuously agglomerated and retained, while the clarified or filtered liquid is continuously withdrawn from a point above the sludge blanket. However, the maintenance of an effective sludge blanket presents a difficult problem.

Leviel et al. point out that extreme difficulty is encountered in maintaining a uniform rate of rising flow through the sludge blanket, chiefly because any nonuniformity in flow velocity that may arise at some point in the blanket tends to assume greater and great proportions, since the water will flow more easily through the sludge blanket at such points. Furthermore, the sludge has considerable viscosity, so as the sludge particles settle, they tend to carry with them by viscous friction appreciable amounts of water. Consequently, large sludge particles carry water flowing in the same direction as they do, thus producing an equal and upwardly directed flow in the immediate vicinity. This will add to the general flow velocity of the rising body of water there, and thus impart locally a flow sufficiently high to prevent sedimentation. Leviel et al. resolve these difficulties by introducing the water containing suspended particles during introduction periods spaced from each other by intermittent settling periods. The water to be clarified is introduced at the bottom of the bed of sludge liquid containing the solid particles, at a speed exceeding the precipitation rate of the sludge particles in the sludge blanket. The result of this is that the sludge particles of the sludge blanket will be lifted, expanding the sludge blanket in an upward direction, and simultaneously displacing at least part of the clarified liquid. The introduction periods are carefully timed, so as not to raise the sludge blanket too much, and so as not to break up the sludge blanket.

A sludge blanket clarification process that requires intermittent feed of the waste water necessarily requires a larger system for a given output, so as to make up for the lost processing time when the flow is cut off. It also requires very careful adjustment of the volume and timing of the introduction of waste water, which is rather difficult to adjust if the volume of sludge in the waste water is variable, as is frequently the case.

Furthermore, after some time, the concentration of the sludge in the sludge blanket increases. This is quite desirable since a highly concentrated sludge blanket provides an excellent filter to trap sludge and permits the passage of clean water therethrough. It is quite difficult if not impossible, however, in the Leviel et al. system to maintain a highly concentrated sludge blanket. This is due to the fact that a highly concentrated sludge blanket will tend to sink in the clarifying apparatus, and if this occurs in the Leviel et al. system, the influent water pulse will not be able to maintain the level of the sludge blanket without at the same time disrupting it, and dispersing the sludge particles. Of course, the very heavy sludge particles will sink to the bottom of the tank, in spite of the influent flow, and in Leviel et al. apparatus no means is provided to remove such heavy particles. Therefore, highly concentrated sludge particles can collect on the bottom of the tank.

Leviel et al. do provide a drain on the side of the tank, however, to prevent too much sludge from accumulating in the blanket, thus causing the blanket to rise excessively high, leaving little room for clarified water. The use of a drain on the side of the tank, however, incurs several disadvantages.

Firstly, it is desirable as explained above to maintain as dense a sludge blanket as possible. A drain can prevent this, since sludge may be withdrawn from the blanket before it has become dense. Moreover, if a very dense sludge blanket forms, it tends to sink, and falls below the level of the drain.

Furthermore, it is desirable that any excess sludge that is eventually removed be as concentrated as possible and contain as little water as possible. This is due to the fact that it is desirable to waste no water, or as little water as possible. Sludges of this character normally collect at the bottom of the sedimentation tank. However, in the Leviel et al. system, since sludge is withdrawn from the sludge blanket itself at an intermediate height in the vessel, it may not be concentrated and can contain a relatively large amount of water.

Hughes, U.S. Patent No. 2,245,587, patented June 17, 1941, describes a process in which the waste water is introduced continuously. Hughes introduces the waste water at the top of a cylinder, through which it is drawn downwardly, with return water and any chemical additives. It then emerges into the main tank, where the water passes upwardly through a sludge blanket formed of the suspended particles. The sludge blanket has a generally upward motion, and is discharged at a fixed drain point on the side of the tank.

Hughes also provides a series of collector pipes at the bottom of the tank through which a certain proportion of the sludge is recirculated for greater efficiency of treatment and separation.

Again, this system has the disadvantage that if a dense sludge is formed, it may form a blanket below the level of the sludge drain on the side of the tank thus the drain will not tap the sludge blanket.

In addition, sludges which are withdrawn at the side of the tank tend not to be concentrated. Thus, a good deal of water can also be wasted in the Hughes system.

Moreover, the dense sludge particles which fall to the bottom of the tank must be sucked up through the collecting line. Such particles are not susceptible of being readily drawn into, and recirculated through the system again. Thus, the cleaning of the bottom of the sedimentation tank is relatively inefficient in the system taught by Hughes.

A third type of sedimentation apparatus has come into use in the field of water clarification. This system generally is composed of a sedimentation tank having a tubular mixing cylinder centrally located within the tank wherein raw water and flocculating agents are introduced and are mixed together by an impeller. An inclined baffle is provided within the tank surrounding the mixing tube. The inclined baffle has a narrow top end and a wide base end. The baffle defines a mixing zone at the interior thereof and a clarification zone between the exterior thereof and the walls of the tank. Fluid that is circulated from the mixing zone flows between the mixing cylinder and the interior of the baffle. A portion of the fluid passes under the baffle into the clarification zone formed between the outside of the baffle and the walls of the tank. This zone is a settling zone, in which a sludge blanket is formed at some intermediate position in the zone. Clear water is drawn from the top of the zone.

The zone has a larger area at the top thereof than at the bottom. Thus, since water is introduced into the zone at a generally constant rate, the velocity of the unclarified water will decrease as the water and the particles are suspended therein and flow upward. At some point in the zone, the settling rate of the particles becomes equal to the upflow rate of the water, and a sludge blanket is formed at this point. The point at which the sludge blanket forms depends upon the density of the sludge, the angle of baffle, and the influent flow rate. However, for any given system, these are generally constant, and thus the level of the sludge bed also generally remains constant. The blanket can become quite dense. If it sinks, it will assume a new level in the tank at a point at which the rate of the influent water balances the settling rate. If for some reason the blanket should become less dense and rise, it will also reach a new level at which the respective settling and upflow rates are equal. The system has proved to be quite efficient due to the hydraulically balanced and stable sludge blanket.

Furthermore, the system is adaptable for use in connection with many different types of waste matter, which are carried in water, and need not be specially fabricated for each application.

After a time, some sludge particles become extremely dense and fall from the blanket to the bottom of the tank. Means such as rakes have been provided to remove these particles from the vessel.

The principal disadvantage of the system described above is that means provided to remove the concentrated sludge particles that settle to the base of the tank has been relatively inefficient. Heavy sludge is normally removed from the vessel by a large revolving rake which extends across the bottom of the sedimentation tank. The rake is normally operated by the same drive mechanism that operates the impeller, and is adapted to move the sludge to a central collection point, from which removal is accomplished.

A series of reduction gears are provided to ensure that the rake moves slowly across the bottom of the tank. The rake cannot be moved rapidly across the bottom, since this would stir up settled sludge, and disturb the sludge blanket above. The slow movement of the rake, however, is hard on the drive mechanism, since high inertial loads occur. This results in frequent breakdown and maintenance of the rake removal system subject.

The rake has also been found to be unacceptable for use with certain types of waste such as fibrous wastes. Such waste material tends to catch on the rake and drag along the base of the sedimentation tank, often creating extremely high loads on the arms, thus causing failure of the drive mechanism.

In accordance with this invention, a waste water clarifier of the general type described immediately above is provided, having means for removing sludge from the bottom of the clarifier vessel.

This water clarifier comprises, in combination, a water clarification vessel; an inclined baffle means in the vessel having a narrow top end and wide base end spaced from the bottom of the vessel for flow of water thereunder, said baffle means defining a mixing zone at the interior thereof, and a clarification zone at the other side thereof between the baffle and the vessel; a tubular mixing enclosure having open top and bottom ends disposed within and extending longitudinally of the baffle, and spaced from the interior walls thereof; an inlet conduit opening into the mixing enclosure for introducing waste water to be clarified and flocculants into the clarifier; a rotatable mixer in the mixing enclosure, adapted to mix waste water flocculants and sludge in the enclosure and circulate the waste water mixture upwardly out of the end of the enclosure, into the narrow end of the baffle means, with a turbulent motion, and circulate the waste water mixture along the interior of the baffle to the base thereof, such that a portion of said water passes under the baffle into the clarification zone, and a portion of said water recirculates through the mixing enclosure; means in proximity to the top of the vessel in the clarification zone for withdrawing supernatant clarified water therefrom; collection means at the base of the clarifier vessel for withdrawing concentrated sludge therefrom; and hydraulic pulse means in the vessel at the base thereof, positioned and adapted to periodically direct a pulse of fluid against concentrated sludge on the base of the clarifier vessel, to move said sludge to the collection means.

This invention also provides in the process for clarifying water, including the steps of turbulently mixing a mass of water to be clarified with flocculating agents, flowing said mass of water upwardly into a constricted area, and then changing the direction of flow to downwardly while slowing the rate of flow, then reversing the direction of flow once again, and flowing water upwardly through a clarification zone while reducing the rate of flow further, such that a sludge blanket is formed in the clarification zone; drawing off supernatant clear water above the slude blanket, while allowing heavy sludge particles to settle beneath the sludge blanket and become concentrated, the improvement which comprises directing a pulse of water against the concentrated sludge at predetermined intervals to move the sludge to a collection point, and withdrawing the sludge at predetermined intervals from the collection point.

The drawings represent a preferred embodiment of the invention.

Figure 1:
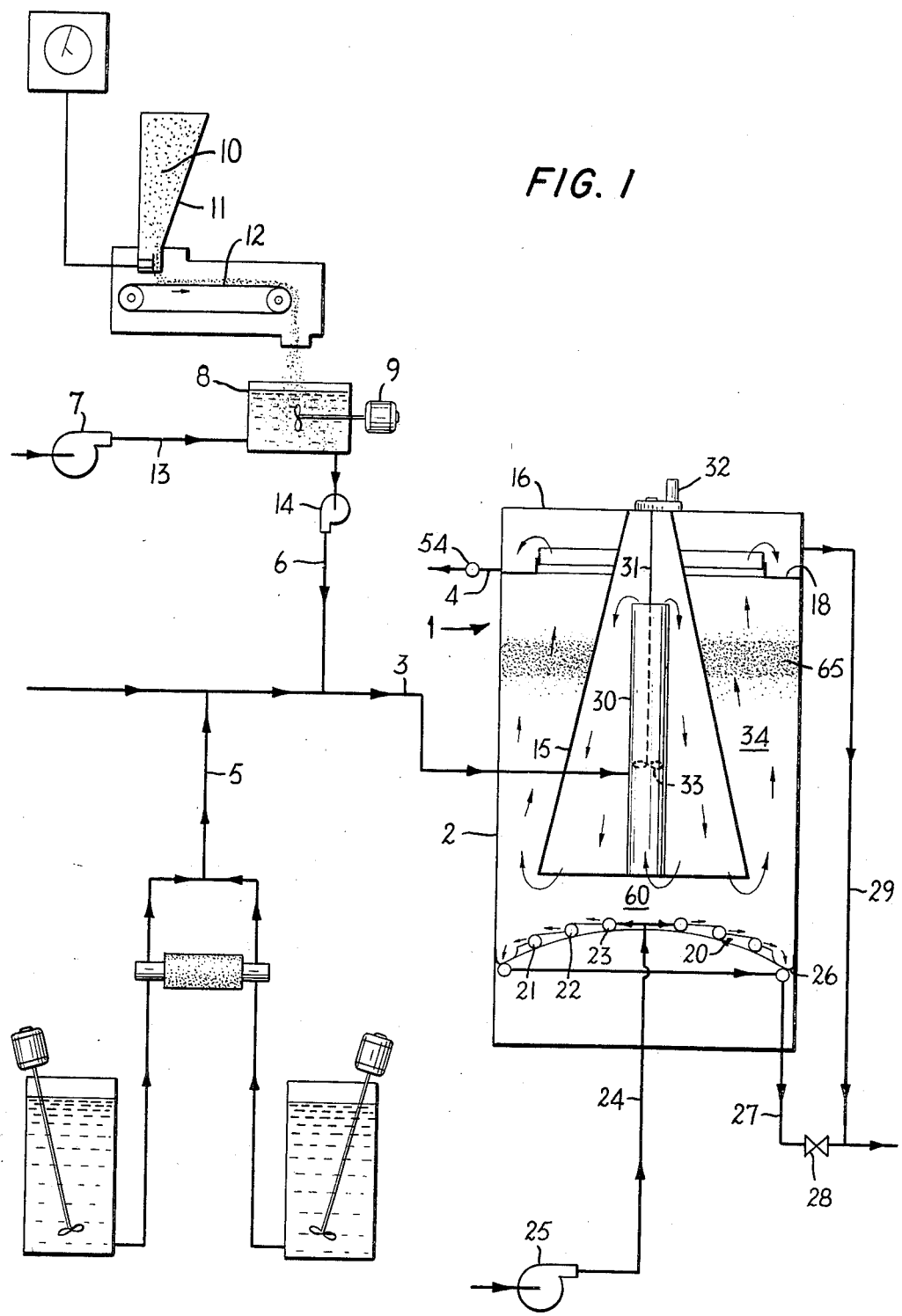
FIGURE 1 is a schematic diagram of a typical waste water clarifier system in accordance with the invention.

The nature of the waste water clarification system of the invention is such that it can be adapted for size to fit any industrial or public need. Units can be provided ranging in size from small units for a small industrial plant or a village to large units for sewage disposal or waste disposal for cities and towns and for very large chemical and petroleum plants. This system is capable of producing water that is clear enough and pure enough to be discharged into any stream or other body of water, or which can be reused.

The clarifier vessel can, for example, be cylindrical, rectangular, square, or polygonal, according to the space in which it is to be put. The inclined baffle is selected according to the shape of the clarifier vessel, and has a narrow constricted portion at the top, which can be closed off from the remainder of the vessel by a plate or the like to prevent water from flowing over the top thereof. However, it is possible to leave the top of the baffle open and merely extend the sides of the baffle well above the water level to prevent any overflow.

The baffle has a wide portion at its base, which is spaced from the base of the vessel for flow of fluid under the baffle. If the clarifier vessel is cylindrical, then the baffle can be conical. If the clarifier vessel is square or rectangular, the baffle can be conical, pyramid-shaped or trough-shaped, with the narrow portion at the top, and the wide portion at the base.

The baffle defines a mixing zone at the interior thereof, normally at the center of the vessel, and a clarification zone between the walls of the clarifier vessel and the exterior of the baffle.

The width of the baffle at the top and the open flow area at the bottom are determined by the degree of turbulence and constraint desired at the top, and the flow delivery volume required through the system. The agglomeration of sludge particles suspended in the water to be clarified is effected with the aid of turbulence, and with the aid of the constriction afforded by the baffle at its top portion. The flow of fluid is downwardly in the interior of the baffle, and then upwardly along the exterior of the baffle, such that at the bottom portion of the baffle turbulent flow has ceased, and the body of water is relatively quiescent. Therefore, the baffle is wide enough at the open base to permit a quiet flow there, at the flow delivery volume required of the system.

Similarly, the baffle is spaced sufficiently from the walls of the clarifier vessel so as to permit a quiet upward flow along the exterior of the baffle. Since the baffle is narrower at the top than at the base, the zone between the clarifier wall and the baffle wall will increase in diameter towards the top of the clarifier vessel, thus further slowing the rate of flow of fluid in this space, as it proceeds upwardly to the outlet from the clarifier vessel at the top. A sludge blanket forms and is suspended in this space between the outlet from the vessel and the bottom of the baffle, at the point at which the upward velocity of the flow is equal to the settling rate of the particles.

The dimensions of the zone should be such that for a given system and for any variations in flow and in sludge density that may occur, the sludge blanket remains in position below the outlet.

It is to be noted, however, that the dimensions which can accomplish this can be tailored to meet the requirements of any system.

One variable which plays a role in the formation of the sludge blanket is the angle of the baffle. Taking the base of the tank as 0°, and a right-angle vertical wall at 90° the baffle should be at an angle not less than 40° and not more than 80° to the base of the vessel.

If the angle is less than 40°, the baffle wall slope will be less than the angle of repose of the sludge and the sludge will tend to deposit on and adhere to the exterior wall of the baffle. On the other hand, if the angle is greater than 80° there is an insufficient difference in the rate of flow of the fluid within the baffle from the top to the base thereof, and a dense sludge blanket may not form; if it does form, it will take an extremely long time to do so. Preferably, the baffle is at an angle within the range from about 45 to about 65°.

The waste water to be clarified is recirculated within the baffle by the mixer to ensure good sludge contact, and the agglomeration of small particles that may remain suspended and non-agglomerated in the water. Consequently, it is advantageous to mix the incoming waste water with a proportion of recirculated water already in the clarifier system. This is done by the mixer and mixing enclosure within the baffle.

The mixer is a stirring means, such as an impeller or a mixing screw, and the mixing enclosure is open at the bottom as well as at the top. Rotation of the mixer draws a portion of the water in the vessel into the enclosure for recirculation and blending with the raw inlet water. The mixture after blending is drawn upwardly by the stirrer, and thrust forcefully towards the narrow top of the baffle.

The effect of the turbulence is to assist in the agglomeration of the particles and assure the intimate contact of the flocculants with the particles. Some sludge particles will adhere to other sludge particles when they are thrust forcefully together. The forceful contact is effected in the turbulent mixing zone, where the mass of water is subjected to constriction.

The flocculating agents, such as aluminum sulphate, and ferric chloride polyelectrolytes are added in the mixing zone to promote flocculation of the solids in the water. Other chemicals such as soda ash and lime may also be added in the mixing zone to control the pH of the water, such that it is slightly basic. This can also promote flocculation of the sludge particles.

The mixer and its speed are responsible in large measure for the degree of turbulence, and the efficiency of mixing and the configuration of the mixer and its speed are selected accordingly to give the amount of turbulence that is required.

Another feature of the water clarifying system of the invention if the change in direction of flow of the water being clarified at the top and at the base of the first baffle. This change in direction further assists in sedimentation and settling of the suspended particles. While it is relatively easy for the fluid to change direction, the heavy sludge particles which are being carried downwardly by the flow of water within the baffle tend to continue to proceed downwardly after leaving the base of the baffle. Flow is relatively non-turbulent at this point, and this fact also aids in permitting large sludge particles to settle out of the suspension.

The remainder of the particles in suspension in the fluid passes into the clarification zone between the baffle and the periphery of the tank.

As indicated, this zone increases in cross-sectional area in the direction of the upward flow. The velocity of flow, as it passes through the zone, decreases due to the increased area. At the point in the clarification zone where the settling rate of the particles equals the upward velocity of the flow, a sludge blanket forms. As the flow of water proceeds through the sludge blanket, the sludge particles suspended in the water become attached to the particles in the blanket, and thus as flow continues the density and weight of the sludge blanket continues to increase, while the water passing through the blanket is freed from particles, and becomes clear. When the sludge particles in the blanket become too heavy to remain in suspension, they settle to the bottom of the clarification zone, joining the dense sludge particles previously separated when the fluid passed beneath the base of the baffles.

The accumulated sludge must be removed from time to time, and a sludge collector is provided to accumulate the sludge particles for removal. The sludge collector communicates with a sludge removal conduit, and a valve is provided to normally close off the conduit. The operation of the valve will be more particularly described hereinafter.

The sludge collector is at the base of the clarifier vessel and is preferably at the periphery thereof. The vessel preferably has an upwardly extending central portion at the base so that any sludge particles collecting in the central portion tend to move down towards the periphery of the tank. The central upwardly extending portion can be a baffle plate in the vessel, or can be formed as the base of the vessel. The central portion can be dome-like or can have a step-like configuration. The combination of the central upwardly extending portion and the peripheral sludge collector has several advantages.

Firstly, it is possible to collect more sludge at the periphery of the base than at the center, since there is more area for sludge collection at the periphery.

Secondly, although some sludge particles collect over the entire base of the sedimentation tank, the largest proportion of particles collects beneath the clarification zone, which in the clarifier described above, is at the periphery of the tank. Moreover, since the flow of water is from the central portion of the tank outwardly to the periphery of the clarification zone, the natural flow of water tends to carry most sludge towards the periphery of the tank. Therefore, only a small proportion of the sludge particles will have to be moved a substantial distance to reach the collector if the collector is at the periphery of the tank. Thus, the central upwardly extending portion and the peripheral sludge collector are preferred.

It is possible however to use a conical sludge collector which collects sludge at the center of the tank. This construction has the advantage that a single outlet can be provided to tap dense collected sludge. Moreover, it is simple and economical to fabricate. As a further possibility, a central sludge collector can be provided, as described above, along with a dome-like baffle above it. This construction has the advantage of a single sludge drain but also incorporates many of the advantages of the dome-like baffle construction.

This construction has proved to be extremely well suited for collecting for fibrous wastes.

In order to drive the sludge particles along the base of the tank to the sludge collector, a plurality of hydraulic pulse outlets are provided. The water flowed through the outlets or through the nozzles is preferably clean water which can be collected from the clarified effluent. This is preferred, since no external source of water is needed. The pulse outlets can comprise nozzles or merely apertures or slots, in a pipe or other conduit, which are located in a position to direct a pulse of water toward the sludge collector which is normally at the bottom of the vessel.

The pulse outlets are preferably on the dome-like baffle portion near the base of the vessel, if such a dome-like portion is provided. The pulse outlets preferably are positioned to direct the pulses generally horizontally toward the periphery of the tank. By directing the pulse horizontally along the base of the clarifier vessel, the sludge is moved quite efficiently, and without creating any substantial turbulence which could disrupt the sludge blanket above. Almost all of the energy of the pulse is used in moving the sludge and little disruption or turbulence is created. If a conical base with a central collector is used, the pulse outlets can, if desired, be directed at the conical base itself. The pulse then dislodges the sludge from the base and permits it to slide along the base to the collection point.

The pulse is normally provided at selected intervals dependent upon the nature of the sludge and the accumulation rate thereof on the bottom of the vessel. However, for most systems during normal operation, the pulse is provided at intervals of from about every 2 minutes to about every 120 minutes, and preferably at from about every 5 minutes to about every 45 minutes.

It is also possible to provide a series of closely spaced pulses after each interval, rather than only one. However, for the purposes of this discussion, the intervals between each pulse of a closely spaced series of pulses can be ignored, and only the interval between each series considered as that to which the range of intervals specified above applies.

The pulse is generally of short duration to ensure that only enough energy and enough clean water are expended to move the sludge the required distance. If the duration of the pulse is too long, turbulence will result, causing the disruption of the sludge blanket. Moreover, a large amount of clean water will be lost when the sludge is expelled from the system, since the sludge will be diluted by the excess pulse water. Thus, steady flow or long pulses of water are unsuitable.

Pulses of from about 1 second to about 15 seconds duration, and preferably within the range of from about 2 seconds to about 5 seconds duration, under pressures of up to about 150 p.s.i., have been found sufficient to move the sludge, and do not either dilute the sludge or disrupt the sludge blanket. The pressure and duration of the pulse used will to a degree depend upon the nature of the sludge. For extremely dense sludges short pulses under pressures approaching 150 p.s.i. are preferred.

The hydraulic pulse can be provided by a pump. It is also possible to employ an elevated storage tank from which the clean water is driven by a cushion of compressed air to provide the high pressure pulses required.

The operation of the sludge removal valve should be synchronized with the operation of the pulse, such that the valve is opened during the pulse. This ensures that sludge is driven into the sludge removal line and that no excess water is lost. If the valve is left open too long, the sludge blanket will drop and much valuable suspendible sludge and water will be lost. It is possible, however, to pulse more often than the valve is opened. This in certain instances, is preferred since water loss in this case is reduced to a minimum.

The timing of the duration of the pulse and of the interval between pulses can be automatically controlled by timing mechanism which are well known to those skilled in the art.

It is to be noted that an important collateral benefit can be obtained by the provision of the hydraulic pulse members in the base of the clarifier vessel. Ordinarily, in starting up a clarifier which employs a sludge blanket, it is necessary to operate at partial efficiency for a good deal of time until a dense sludge blanket is developed. This can take between three to six hours. By providing a pulse means, it is possible to establish a sludge blanket in five to ten minutes by continuously supplying a pulse to the base to stir up sludge, and prevent the sludge particles from sedimenting out of the suspension. After the sludge blanket has been established, normal pulse operation can be resumed.

This means that it is possible to operate the instant assembly on a batch system. This is extremely desirable since for many applications the flow of impure influent water is supplied for only several hours at a time. Batch operation was unfeasible for systems employing a side drain since there was no convenient way to remove the sludge that would settle to the bottom of the vessel upon shut-down. Furthermore, the long time required for start-up of the prior apparatus also made batch operations unfeasible.

The instant invention also provides means for withdrawing supernatant water above the sludge blanket. Such means can conveniently take the form of a trough, having a high inner side wall. Clear water spills over the top of the trough into a collector, and thence to the outlet.

Figure 2:
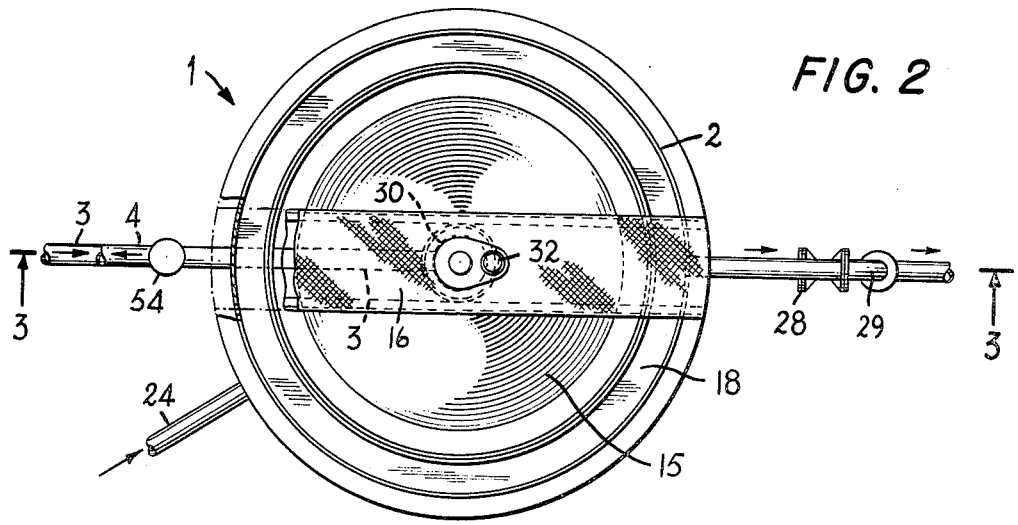
FIGURE 2 is a plan view on an enlarged scale of the clarifier unit in accordance with the invention as shown in FIGURE 1.
Figure 3:
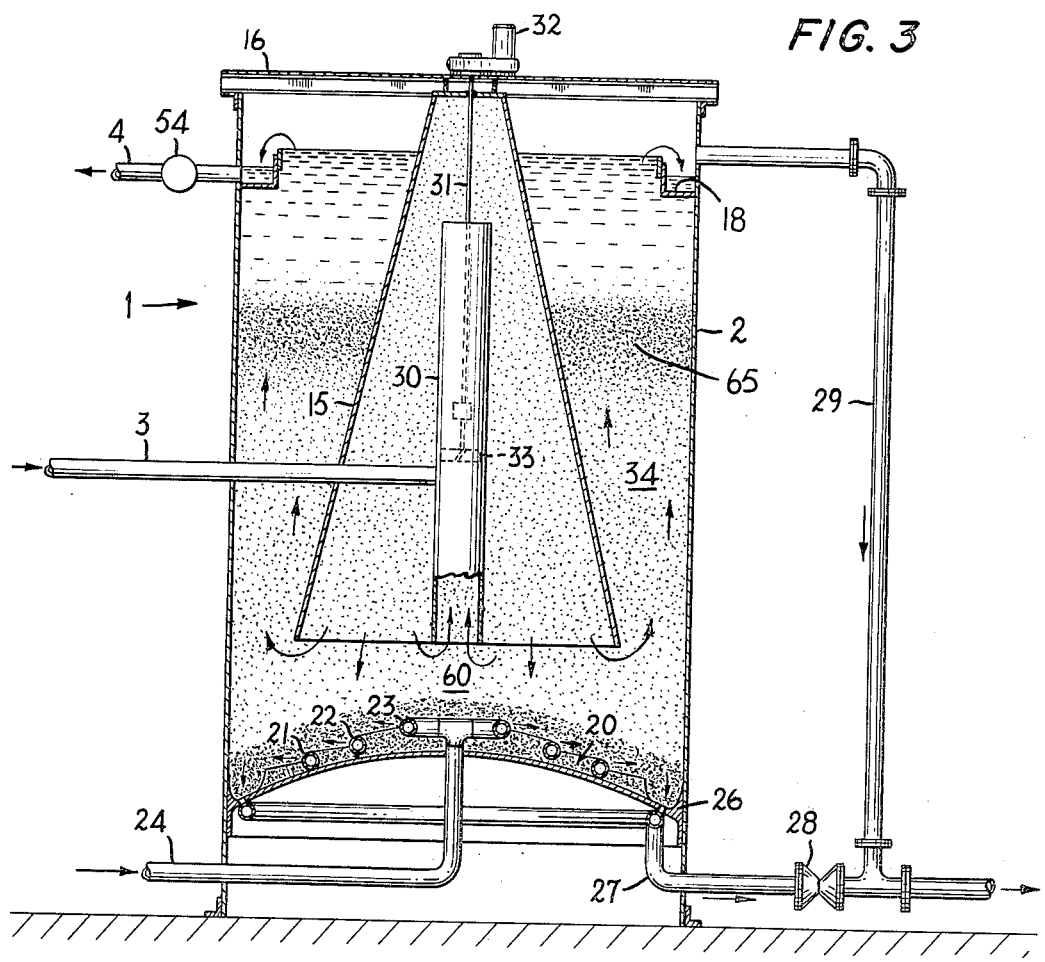
FIGURE 3 is a section on the same enlarged scale, taken along the lines 3—3 of FIGURE 2.

The exemplary waste water clarifier system in accordance with the invention that is shown in FIGURES 1 to 3 comprises a water clarifier unit 1 composed of a clarifier vessel 2 equipped with a raw water inlet 3 and a clarified water outlet 4.

Associated with the raw water inlet 3 are two lines 5, 6 for feeding of chemical treating agents to the raw water. Line 5 feeds ferric sulfate to the raw water line 3. Line 6 feeds a lime slurry to the raw water line 3. The slurry is formed in the dissolving box 8 fitted with stirrer 9. Water is pumped into the box via pump 7 and line 13. Powdered lime 10 is fed by the gravimetric chemical feeder 11 and the conveyer belt 12 to the dissolving box 8, whence it is pumped through line 6 via pump 14 to the raw water inlet line 3.

The water clarifier unit 1 is composed of a vessel 2 with an upright conical baffle 15 dependent from a support 16 extending across the top of the vessel 2. The vessel, is cylindrical, as is best seen in FIGURE 2, and the baffle 15 is centrally placed therein to define a turbulent zone at the center and a clarification zone at the periphery of the vessel. Extending about the periphery at the top of the vessel is a collecting trough 18, for reception of supernatant clear water, which is fed via the outlet 4 to the remainder of the system.

At the bottom of the vessel 2 is a convex dome-like baffle 20 with a plurality of circular pulse outlet rings 21, 22, 23, fed from a common line 24 with water via pump 25. At the periphery of the baffle 20 is a sludge collector ring 26 for reception of sludge, which is withdrawn through line 27 whenever the valve 28 is opened, and then brought to drain. An overflow pipe 29 also runs to drain from the top of the vessel.

Supported within the conical baffle 15 is a mixing cylinder 30 open at its top and bottom ends. A stirrer 31 is located in the cylinder 30, at a point just above the entry of inlet line 3. This stirrer is powered by the drive motor 32. The stirrer blades are so placed as to rotate and draw the water upwardly in the cylinder 30, and out of the top. The water is turbulently mixed in the cylinder, and is then constrained within the constricted space at the top of the cone. Thereafter, the general flow of water is downwardly within the conical baffle outside the cylinder 30, out of the open base, and then upwardly in the clarification zone 34 along the exterior of the baffle to the collecting trough 18, whence the water is withdrawn through the line 4.

A pH sensor 54 is provided in the outlet line 4 to monitor the pH of the water from the clarifier unit 1.

The operation of the water clarifier system shown in FIGURES 1, 2 and 3 is as follows: Raw water to be clarified, containing sediment and dissolved impurities, is fed through line 3, where it is mixed with ferric sulfate solution via line 5 and with lime slurry via line 6. It then enters the interior of the cylinder 30, where it is drawn upwardly in a rotating movement by the action of the impeller 31, at the same time being blended with liquid from the bottom of the clarifier vessel 2, which is also drawn upwardly from the bottom of the tube 30. The blend emerges turbulently at the top of this cylinder, entering the tip area of reducing diameter at the upper part of the conical baffle 15. Since the diameter of the cone is reduced, the flow, spiralling in the upward direction, constricts the mixing fluid, and imparts turbulence to the mixture, with very high Reynolds numbers. This ensures through mixing, and it also tends to agglomerate the suspended particles.

The turbulent mixture is forced downwardly, in order to emerge from the baffle at its base, and as it does so, it encounters an increasing diameter within the baffle, as the result of which the rate of flow continuously decreases as the mixture flows towards the bottom. This has the effect of decreasing the turbulence of the mixture. Some settling, in fact, takes place in the area at the bottom of and below the baffle adjacent the bottom of the tank, which defines a quiescent zone 60 in which settling can take place relatively undisturbed by circulation of fluid. The fluid flows under the bottom edge of the baffle 30, and thence upwardly along the outside of the baffle 30, into the clarification zone 34. The sludge can be carried around the corner of the baffle, and upwardly with the flow of fluid. Such sludge is mainly composed of small particles, which are more readily entrained in the moving slurry. The heavier particles of sludge enter the relatively quiescent zone 60, adjacent the bottom of the tank from which they can settle out onto the baffle 20 at the bottom of the vessel.

The fluid flowing upwardly along the exterior of the baffle 15 also encounters a gradually increasing diameter in the space 34, and so the rate of flow of fluid upwardly decreases continuously, as the fluid nears the top of the vessel 2. This slowing in the rate of flow makes it possible for any sludge particles that have been carried along with the fluid to form a sludge blanket 65 at some equilibrium point between the top of the vessel and the bottom of the conical baffle 15. This sludge blanket is free to move upwardly and downwardly, according to the rate of flow of the raw water. The rate, however, is maintained such that the blanket is not brought high enough to reach the trough 18 at the top of the vessel.

As water flows upwardly through the blanket, the particles in the water are trapped and agglomerate with the particles in the blanket. Water emerging above the sludge blanket is clear and it is collected via the collection trough 18. The water is collected and is withdrawn from the trough through line 4.

As the sludge blanket builds up, the particles tend to become heavier, and the heaviest particles leave the sludge blanket and settle to the base of the tank. As sludge collects beneath the quiescent clarification zone 34 and in the zone 60, it tends to settle on the baffle 20, and move toward sludge collector 26 at the periphery of the vessel.

From time to time, to clean out the sludge, a pulse of clean water is introduced through line 24 and the pulsation rings 21, 22, 23. These rings eject the flow in a sidewise direction, tending to thrust the sludge to the periphery of the vessel 2, where it is forced into the sludge collector ring 26. This pulsating flow is tangential to the flow of fluid emerging from the bottom of the conical baffle, and tending to rise upwardly in the tank, and this does not disturb the sludge blanket.

The pulse duration is 3 seconds and the jet of water is under a pressure of 90 p.s.i. A pulse of this character is repeated every 45 minutes. The valve 28 is synchronized to the operation of the pulse, and it is opened for 3 seconds, whenever the pulse occurs.

No scraping arms which are subject to mechanical breakdown are required, and the base is kept free of sludge, no matter what its characteristics without the disruption of the sludge blanket.

Figure 4:
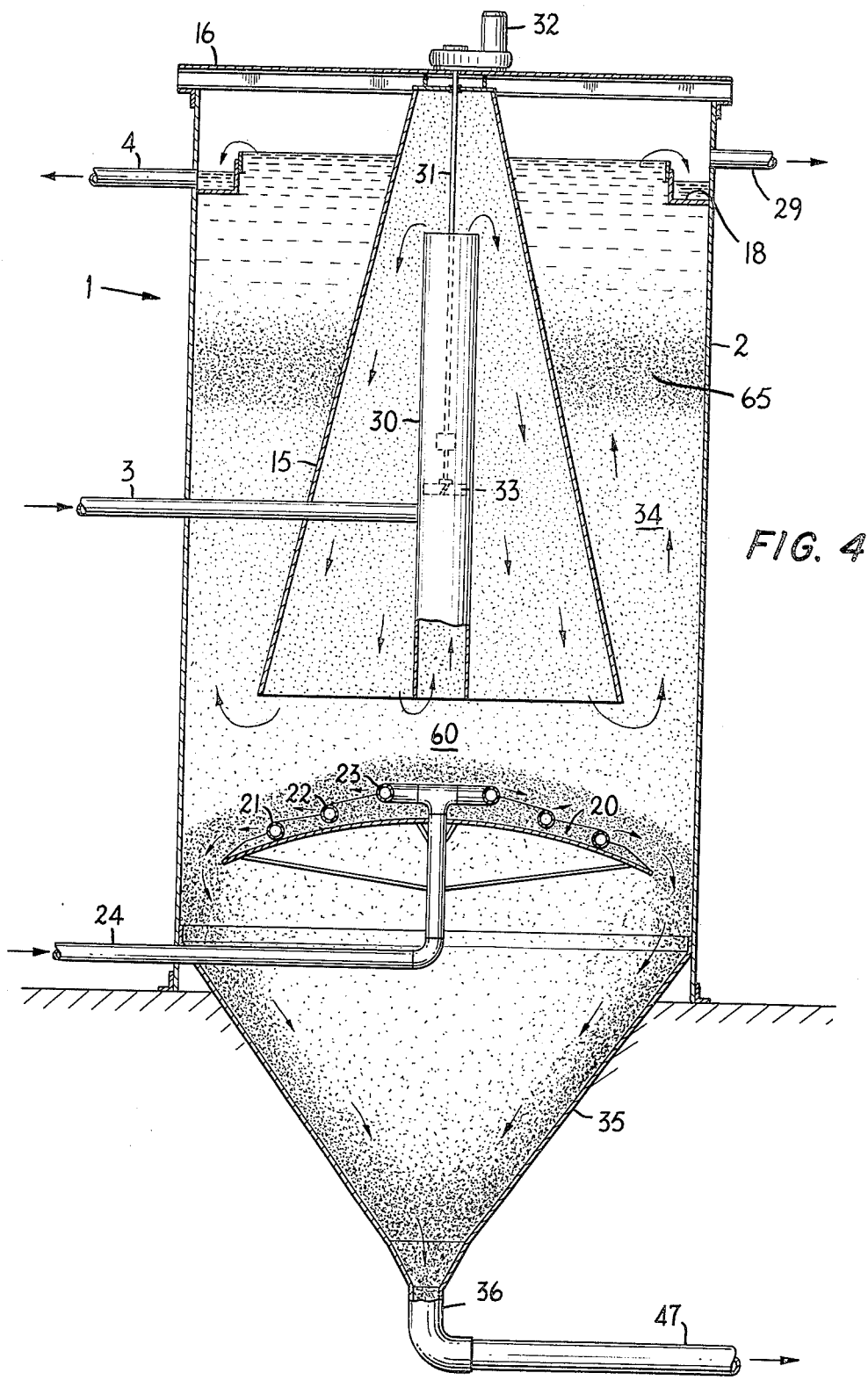
FIGURE 4 is a plan view of another embodiment of a clarifier in accordance with this invention.

The embodiment shown in FIGURE 4 is similar to that described above with the exception that a conical sludge collector trough 35 is provided. This conical trough is located at the base of the vessel and has a single central sludge collector duct 36 which communicates with a sludge drain-off line 47. The dome-like central baffle 20 in this embodiment is spaced from the periphery leaving a space through which sludge is moved by the hydraulic pulse of clean water to flow downwardly to the central collection trough. If desired additional pulse outlets can be provided at the sides of the trough 35 to assist in the downward flows of the sludge. The operation of this embodiment is substantially the same as the embodiment previously described with the exception that sludge is collected via the central trough rather than at a peripheral sludge collector.

Having regard to the foregoing disclosure, the following is claimed as the inventive and patentable embodiments thereof.

1. A water clarifier comprising, in combination, a water clarification vessel; an inclined baffle means therein having a narrow top end and a wide base end spaced from the bottom of the vessel for the flow of water thereunder, said baffle means defining a mixing zone at one side, and a clarification zone at the other side thereof between the baffle and vessel; a tubular mixing enclosure having open top and bottom ends disposed within and extending longitudinally of the baffle and spaced from the interior walls thereof; an inlet conduit opening into the mixing enclosure for introducing waste water to be clarified into the clarifier; a rotatable mixer in the mixing enclosure, adapted to mix waste water and sludge in the enclosure and circulate the mixture upwardly out of the top end of the enclosure, into the narrow end of the baffle means with a turbulent motion, and circulate the waste water mixture along the interior of the baffle to the base thereof, such that a portion of said mixture passes under the baffle into the clarification zone and a portion of said water recirculates through the mixing enclosure; means in proximity to the top of the vessel in the clarification zone for withdrawing supernatant clarified water therefrom; collection means at the base of the clarifier vessel for withdrawing concentrated sludge therefrom; and hydraulic pulse means in the vessel positioned and adapted to periodically direct a pulse of fluid against concentrated sludge at the base of the clarifier vessel, to move said sludge toward the collection means.

2. A water clarifier in accordance with claim 1 in which the base of the clarification vessel is formed with an upwardly extending central portion.

3. A water clarifier in accordance with claim 2, in which the hydraulic pulse means are located along the upwardly extending central portion, and directed to move sludge away from the said central portion.

4. A water clarifier in accordance with claim 1, in which the pulse means direct flow toward the periphery of the vessel, and in which the sludge collector is at the periphery of the vessel.

5. A water clarifier in accordance with claim 1, in which the sludge collector is centrally located in a trough at the base of the vessel.

6. A water clarifier in accordance with claim 1 including a valve means associated with the collection means for controlling the withdrawal of concentrated sludge from the vessel.

7. A water clarifier in accordance with claim 1, in which the baffle is conical.

8. A water clarifier in accordance with claim 1, including means supplying water under a pressure of up to about 150 p.s.i. to the pulse means at predetermined intervals of from about 2 to about 120 minutes.

9. A water clarifier in accordance with claim 1, in which the duration of the pulses is from about 1 to about 15 seconds.

10. A water clarifier comprising, in combination, a water clarification vessel, having a peripheral wall; a first baffle centrally located in proximity to the bottom of the vessel, a conical baffle and having a narrow top end and wide base end, said base end being spaced from the bottom of the vessel for the flow of water under said conical baffle, and the walls of said conical baffle being inclined at an angle of from about 40 to about 80 degrees, and defining a mixing zone centrally within the vessel at the interior of the baffle; a tubular mixing enclosure within and extending longitudinally of the conical baffle, said enclosure having open top and bottom ends, and being spaced from the walls of the conical baffle, an inlet conduit opening into the mixing enclosure for introducing waste water to be clarified; a fluid line communicating with the mixing enclosure for introducing flocculating agents into the mixing enclosure; an impeller in the mixing enclosure to mix the flocculating agents, sludge and water in the enclosure upwardly out of the top end of the enclosure and circulate the mixture into the narrow end of the conical baffle to the side base thereof, such that a portion of said mixture passes under the conical baffle into the clarification zone, and a portion of said mixture is recirculated to and through the mixing enclosure; a trough in the clarification zone at the top of the vessel for withdrawing supernatant clarified water; a sludge collector at the bottom of the clarification vessel for withdrawing concentrated sludge therefrom; a conduit communicating with the collector for withdrawing the concentrated sludge from the assembly; valve means normally closing off the conduit except during predetermined intervals; and a hydraulic pulse means along the first baffle adapted and positioned to periodically direct a pulse of fluid against the concentrated sludge on the first baffle, and move said sludge toward the sludge collector.

11. In the process for clarifying water which comprises turbulently mixing a mass of water to be clarified with flocculating agents, flowing said mass of water upwardly into a constricted area, and then changing the direction of flow to downwardly while slowing the rate of flow, then reversing the direction of flow once again, and flowing water upwardly through a clarification zone while reducing the rate of flow further, such that a sludge blanket is formed in the clarification zone; drawing off supernatant clear water above the sludge blanket, while allowing heavy sludge particles to settle beneath the sludge blanket and become concentrated, the improvement which comprises, directing a pulse of water against the concentrated sludge at predetermined intervals to move the sludge to a collection point, and withdrawing the sludge at predetermined intervals from the collection point.

12. A process in accordance with claim 11, in which the pulse is provided under a pressure of up to about 150 p.s.i.

13. A process in accordance with claim 11, in which the pulse is provided at intervals of from about 2 to about 120 minutes.

14. A process in accordance with claim 11, in which the duration of the pulse during each interval is from about 1 to 15 seconds.

15. A process in accordance with claim 11, in which the sludge is withdrawn during a hydraulic pulse.

References Cited

UNITED STATES PATENTS

| | | | |
|---|---|---|---|
| 1,427,446 | 8/1922 | Denoel | 210—534 |
| 2,245,588 | 6/1941 | Hughes | 210—208 X |
| 2,464,264 | 3/1949 | Schneible | 210—534 |
| 2,838,180 | 6/1958 | Lawlor | 210—208 X |
| 3,068,172 | 12/1962 | Leviel et al. | 210—19 |

MICHAEL E. ROGERS, Primary Examiner

U.S. Cl. X.R.

210—20, 208, 534